Patented July 31, 1934

1,968,243

UNITED STATES PATENT OFFICE

1,968,243

PROTECTIVE COATING COMPOSITION

Robert D. Bonney, Glen Ridge, and Walter S. Egge, East Orange, N. J., assignors to Congoleum-Nairn, Inc., a corporation of New York No Drawing. Application November 19, 1931, Serial No. 576,205

20 Claims. (Cl. 134—26)

The present invention relates to compositions particularly adapted for use as protective coatings.

Drying and semi-drying oils form the base or vehicle of a great variety of paints, enamels, and varnishes, heretofore widely used for protective coatings. More recently, the esters of cellulose have been employed as the base or vehicle for another and distinct series of protective coating compositions. Each type of vehicle offers certain advantages and disadvantages. Thus, protective coating compositions of the drying oil type are cheaper, form more elastic films, and can be applied more readily, but require a very considerable time to properly dry and harden. On the other hand, compositions of the cellulose ester type set quickly, but are relatively expensive, more difficult to apply, and possess low distensibility for a given hardness.

The ultimate object of the present invention is to provide a new type of protective coating which, to a marked degree, is superior in toughness, distensibility, elasticity, and resistance to solvents, as compared with the heretofore known coatings employing either a drying oil or a cellulose ester base. A further object is to provide protective coating compositions which will yield films having such properties and which also possess the highly desirable characteristic of quick drying and hardening under atmospheric conditions.

Our invention contemplates a novel type of protective coating which, in its preferred form, comprises as a base, (1) as one component, that component of an oxidized drying or semi-drying oil which is in fluid phase and is substantially free from coagulated constituents, such as linoxyn, and which has been separated from a substantial proportion of unoxidized or unoxidizable oil constituents of the oxidized oil and which may have been separated from a substantial proportion of certain undesirable oxidized constituents, and (2) as another component, cellulose nitrate. Preferably the compound base also comprises a resin, as another component, or as a part of the first mentioned component especially combined therewith in the manner hereinafter described. In the production of commercial products, the compound base is dissolved in suitable selected solvents and may be combined with pigments, fillers, dyes, etc., to form a wide variety of protective coating compositions. Our invention further contemplates the method of preparing such protective coating compositions and the ultimate composition in hardened state and in film or other form.

In preparing the oxidized oil component above defined for the novel type of protective coating compositions of our invention, we prefer to employ linseed oil as the raw material. Other drying or semi-drying oils, such as perilla oil or soya bean oil, may be used, but such oils as tung oil or fish oil, are to be avoided, since they yield very little of oxidized constituents of the oil in the uncoagulated or fluid phase. While the oxidized oil component may be prepared wholly from linseed or other drying or semi-drying oil, it is preferable to combine therewith a substantial amount of a resin. The resin not only assists in the formation of the desired oxidized oil component, but serves to improve the gloss, adhesion, hardness, and film building properties of the ultimate composition. A wide choice of suitable resins is available, among which may be mentioned, ester gum, fused Congo, Congo ester, cumaron, numerous oil-soluble or oil-reactive synthetic resins of the phenol-formaldehyde type either with or without rosin, etc. We prefer to employ ester gum (rosin ester) since it is inexpensive, uniform in quality, light in color, and easily soluble in the oil. For special purposes, however, other resins may prove more desirable.

The general method of forming the oxidized oil component of the compound base and of combining the resin therewith, when a resin is employed, is typified by the following specific example. Three parts of linseed oil and one part of ester gum resin, by weight, are heated to about 115° C. until the resin is dissolved. The temperature is then lowered to about 80° C. and a suitable drier, for example, .04% cobalt linoleate, is added. The batch is then aerated at a temperature approximating 80° C. for 25 to 30 hours until it becomes very viscous. When a tested sample just fails to completely dissolve in ethyl ether, the oxidation is discontinued. The batch is then cooled and treated to effect the separation above mentioned, as by extraction with an excess of a solvent capable of dissolving the unoxidized and unoxidizable oil constituents and certain oxidized constituents which are undesirable in large proportions as ingredients of the base, but possessing little, if any, solvating action on the oxidized but uncoagulated constituents of the oil or oil-resin mixture which are desirable ingredients of the base. The preferred solvent is petroleum ether (boiling range 30–75° C.) and about three to five volumes thereof to one volume of the oxidized oil or oil-resin batch are desirable. Petroleum naphtha (boiling range 60°–160° C.) may be used as an equivalent extracting solvent. The oxidized but uncoagulated constituents of the oil or oil-resin mixture in fluid phase which are desirable ingredients of the coating composition, form a lower layer, while substantial proportions of the unoxidized and unoxidizable oil constituents and of the above-mentioned undesirable oxidized constituents dissolve in the extracting solvent forming an upper layer which may be removed by decantation. The extraction process is preferably repeated two or three times to assure an adequate separation. The remaining portion of the oxidized oil or oil-resin mixture is then subjected to low heat, preferably in a vacuum, to remove the last portions of the extracting solvent, after which it constitutes the desired component of the oxidized oil or oil-resin mixture and is ready to be combined with a cellulose nitrate to form the compound base for the protective coating of our invention. For convenience in handling and to prevent premature gelation and solidification, the desired component of the oxidized oil or oil-resin mixture, which component is obtained by oxidation and separation and is substantially free of coagulated oxidation products and has been separated from a substantial proportion of unoxidized and unoxidizable oil constituents and oxidized but undesirable oil constituents and is in fluid phase, is dissolved in a suitable solvent, such as toluene, butyl acetate, xylene, hi-flash coal tar naphtha, etc., to provide a 60 to 80% solution. When other drying or semi-drying oils or other resins or no resins are employed, the process will be carried on in the same manner. The proportions of oil and resin may, of course, be varied as desired. The foregoing method of embodying a resin in the base in the production of a coating compound is the special method above referred to, but it is to be understood that such natural and synthetic resins as are oil-soluble or oil-reactive may, if desired, be simply added directly to the previously prepared and separated desired component of oxidized oil.

It is to be noted that in the treatment of the raw oil or resin-raw oil mix, the oxidation is discontinued at, or just before, the point where the oxidized oil first commences to coagulate to the gel or linoxyn phase. This point may be determined by the ethyl ether test. So long as no linoxyn is formed, the constituents of the batch undergoing oxidation will dissolve completely in ethyl ether, but upon the formation of linoxyn, a cloudy precipitate will apepar in the sample tested. Following the above described method, the yield of oxidized but uncoagulated constituents of the oil which are in fluid phase and are desirable ingredients of the oxidized oil component and of the coating composition (i. e. that portion of oxidized oil, soluble in ethyl ether, but insoluble in petroleum ether) varies from 60% to 85%, by weight, of the oil after completion of the oxidizing treatment thereof. To a considerable extent, the yield depends upon the nature of the resin employed. A resin, such as rosin, which is strongly acidic in character, serves apparently as a peptizing agent to retard the coagulation of the oxidized constituents of the oil to the solid or linoxyn phase, thus giving a higher yield of the desired oxidized constituents of the oil in the fluid phase. On the other hand, if no resin is employed, or if a nearly neutral resin such as ester gum is selected, the yield will be somewhat lower.

When employing no resin or a neutral or weakly acid resin in the preparation of the oxidized oil or oil-resin component, the percentage yield of desired oxidized constituents of the oil may be somewhat increased according to a modification of the above method which involves the addition, to the oil or oil-resin mix prior to the oxidation thereof, of a small amount—.1% to 2% of maleic acid (or maleic acid anhydride) or an equivalent acidic substance, difficultly volatile at processing temperatures. The maleic acid may be added in the dry state or in solution in a solvent of which one example is acetone. This modified process is described and claimed in our co-pending application, Serial No. 576,204 filed November 19, 1931.

The oxidized but uncoagulated constituents of the oxidized oil or oil-resin mixture, in fluid phase, which are soluble in ethyl ether, but insoluble in petroleum ether, are composed chiefly of the oxidized glycerides of linolenic and linolic acids which are desirable constituents of the desired oxidized oil component and of the base. The unoxidized and unoxidizable constituents of the oil and oxidized constituents of the oil which are undesirable in large proportions as ingredients of the oxidized oil component of the base, all of which are normally present after completion of the oxidizing treatment and which are removed by the extraction process from the product of the oxidation treatment to the extent herein indicated, comprise chiefly glycerides of stearic, palmitic and other saturated acids, together with unoxidized glycerides of linolic and linolenic acids and the oxidized glycerides of oleic acid, and constitute substantially all of the difference between the above-mentioned yield of desired oxidized constituents of the oil and the total quantity of oil that has been subjected to the oxidizing treatment.

To complete the preparation of the protective coating of our invention, the desired separated oxidized oil or oil-resin component in liquid phase, is combined with cellulose nitrate. The components may be mixed in any proportions, but the practical range will be found to be about two to six parts, by weight, of the oxidized oil or oil-resin component to one part of the cellulose nitrate component. The preferred ratio is about three to one.

We give below the percentage composition, by weight, of examples of typical protective coating compositions embodying our invention. In each case, the oxidized oil component has resin combined therewith and constitutes an oil-resin component and is prepared in accordance with the method described above, employing linseed oil and ester gum resin in the ratio of three to one. The cellulose nitrate is a solution of ½ second cotton of the type commonly used in pyroxylin compounds. The solvent mixture is one which is particularly satisfactory for use with the compound vehicle although its formula may be varied quite widely, and it includes the solvents in which the nitro-cellulose and oxidized oil or oil-resin component are separately dissolved prior to being combined.

*Clear protective coating composition*

10%—cellulose nitrate
30%—separated component of oxidized linseed oil-ester gum mixture.
60%—solvent comprising:

|  | Percent |
|---|---|
| Butyl acetate | 20 |
| Butyl alcohol | 20 |
| Ethyl acetate | 10 |
| Ethyl alcohol | 5 |
| Toluene | 45 |

*Pigmented protective coating composition*

5%—cellulose nitrate

15%—separated component of oxidized linseed oil-ester gum mixture
7.5%—titanium dioxide
7.5%—lithopone
65%—solvent comprising:

| | Percent |
|---|---|
| Butyl acetate | 20 |
| Butyl alcohol | 20 |
| Ethyl acetate | 10 |
| Ethyl alcohol | 5 |
| Toluene | 45 |

It will be noted that the compositions of the above formulæ contain 35-40% of non-volatile matter. When applied to various kinds of surfaces to provide films thereon, either by spraying, brushing, or dipping, the resulting films will dry in about thirty minutes, to form tough, elastic, durable, and adherent coatings having a distensibility and tensile strength markedly superior to such characteristics of heretofore known compositions of either an oil or cellulose ester base. Furthermore, such films will resist the action of a five percent caustic alkali solution for twenty-four hours or more—a remarkable property in a film composed chiefly of linseed oil.

An important feature of our invention is the manner in which the resin is combined with the oxidized oil component, when a resin is employed. By admixing the resin with the oil prior to oxidation, and oxidizing the mixture, it is possible to incorporate in the compound vehicle many resins such as para cumaron, fused Congo, and numerous of the synthetic oil-soluble or oil reactive phenol-formaldehyde resins, which are normally but slightly compatible with cellulose nitrate. Also, as above pointed out, the presence of a resin in the oil during the oxidation facilitates the production of oxidized oil in fluid phase.

Although it is preferable that the amount of unoxidized and unoxidizable oil constituents remaining in the desired oxidized oil component separated from oil or oil-resin mixture which has been subjected to oxidation should be at a minimum, nevertheless the difficulty in securing, in commercial operation, a quantitive elimination of these constituents, makes it inexpedient to render the separated oxidized oil component used as a component of the base entirely free therefrom. The advantages of this invention accrue from the elimination from that component of oxidized oil which is used as a component of the base, of any substantial proportion of unoxidized and unoxidizable and oxidized but undesirable constituents of drying or semi-drying oil that has been subjected to the oxidation treatment, very good results being obtainable when the separation is carried to such extent that those constituents of the base which are obtained from oil that has been subjected to oxidizing treatment comprise about 90% or more of desired oxidized constituents of the oil, and the advantages of the invention become more pronounced as that percentage is increased. As further defining the character of the oil component we have found that the iodine value of the desirable oxidized oil component separated from the constituents above mentioned which are present in drying or semi-drying oil that has been subjected to oxidizing treatment, is less than 105 and usually in the range of 80 to 90.

From the foregoing general description and illustrative examples of procedure in accordance with this invention and of the results thereof, important features and effects of this invention which are inherent in such procedure and results become apparent. An important feature is that that component of the base which is obtained from oxidized drying or semi-drying oil, is not merely oil that has been subjected to oxidizing treatment and is of the usual complex composition resulting from oxidation of oil with little, if any, regard for the nature of the final product, but such component of the base is a component or fraction, taken from oxidized oil, which has definite characteristics clearly distinguishing it in important respects from the oxidized oil. Thus, the oxidized oil component is taken from drying or semi-drying oil that has been subjected to oxidizing treatment which is preferably discontinued prior to substantial coagulation of oxidized constituents of the oil and thereby limited substantially to the formation of uncoagulated products of oxidation, the oxidation preferably being carried out under such conditions and in the presence of such substances that extensive formation of desired oxidized constituents is effected without such coagulation. Also, the oxidized oil component made and used in accordance with this invention is in liquid phase and substantially free of coagulated products of oxidation such as linoxyn, and it has been separated from a substantial proportion and preferably a major proportion of unoxidizable and unoxidized and certain oxidized constituents of the oil which naturally occur in drying or semi-drying oil that has been subjected to oxidation.

It will also be apparent that when a resin is included in the base it may be simply added to the oxidized oil component previously produced by oxidation and separation of the oxidized oil, but the addition of the resin to the oil before the oxidizing step is performed is a feature possessing several advantages. By adding the resin to the oil before the oxidizing step, resin is conveniently incorporated in the base; and such procedure makes possible the complete incorporation in the base which contains nitro-cellulose of resins which are normally but slightly compatible with cellulose nitrate; and by employing a strongly acidic resin there is effected the retardation of coagulation of oxidized constituents of the oil, resulting in an increase in yield of desirable oxidized constituents of the oil in liquid phase and suitable as ingredients of the base.

As pointed out above, the oxidized constituents of the oil which are desirable as ingredients of the desired component of the oxidized oil and as ingredients of the base are the oxidized glycerides of linolic and linolenic acids in fluid phase and uncoagulated. In an oxidizing treatment performed to produce coagulated products of oxidation, such as linoxyn, as in the production of linoleum, or in an ordinary or uncontrolled oxidizing treatment, these substances are produced wholly or largely in the coagulated form and they are insoluble in solvents commonly used in coating compositions and are not suitable for use as an ingredient of such compositions. In the practice of this invention the oxidizing treatment is so limited, or such assistance is afforded by the presence of an acidic resin or other coagulation-retarding agent, that these desired oxidized constituents of the oil are produced in fluid phase. In that form these desired oxidized constituents possess the property of coagulating and hardening without substantial further oxidation and even without contacting with air, and they are soluble in solvents commonly employed in coating compositions, and a coating comprising a solution thereof hardens rapidly upon evaporation of the solvents to form a tough and adherent film of high distensibility, and they are compatible with nitro-cellulose in a common solvent to such a high degree that a coating composition comprising the desired oxidized constituents in fluid phase and nitro-cellulose can be successfully made and used even though the quantity of those oxidized constituents is several times as great as the quantity of nitro-cellulose present. If any of the desired oxidized constituents are coagulated in the oxidizing step, or thereafter, they will be precipitated when the separated desired oxidized constituents are dissolved in the solvents therefor above named. The unoxidized and unoxidizable constituents of the oil which are not oxidized in the oxidizing treatment which is so conducted as to produce the desired oxidized constituents in fluid phase, are constituents of the oil subjected to oxidizing treatment which cannot be oxidized in that treatment or by contact with air and do not possess the property of hardening, such as glycerides of saturated organic acids of which stearic and palmitic are examples; or they are constituents of the oil which are capable of being converted by the oxidizing treatment into substances having the property of hardening and which were not so converted in the oxidizing treatment but will harden under the action of air or other oxidizing treatment, such as glycerides of linolic and of linolenic acids. The other products of the oxidizing treatment which have certain undesirable characteristics, above mentioned, are oxidized constituents which do not possess the property of coagulating or hardening either upon standing or upon exposure to the air or to other oxidizing influences, such as oxidized glycerides of oleic acid.

While the separation of desired oxidized constituents of the oil from unoxidized and unoxidizable and oxidized but non-hardening constituents is incomplete in commercial operation, as pointed out above, the separation effects a division of the oxidized material into a fraction which is richer in desirable oxidized constituents than is the whole product of oxidation and which possesses to a high degree the characteristics rendering it superior as an ingredient of a coating composition, and a fraction which is richer in constituents which are unoxidized or unoxidizable or non-hardening, though oxidized, than is the whole product of the oxidation. In this connection, it may be noted that oxidizable but unoxidized constituents remaining in the base with the desired oxidized constituents, will harden under the action of air although they will do so more slowly than will the desired oxidized constituents harden without substantial further oxidation and a coating comprising the base above defined possesses a markedly higher resistance to attack by solvents and alkalies and weathering than does a coating containing all of the unoxidizable and non-hardening oxidized constituents which are normally present in oxidized drying or semi-drying oil.

The inherent characteristics of the oils mentioned as examples of oils useful in connection with this invention well indicate the type of oils which are suited to treatment in accordance with this invention. They contain a high proportion of constituents, such as glycerides of linolic and of linolenic acids, which are capable of being converted in the oxidizing treatment to substances which are in fluid phase and capable of coagulating and hardening without substantial further oxidation; they contain a relatively low proportion of substances, such as glycerides of saturated organic acids, which are not oxidizable into desired oxidized constituents in the oxidizing treatment; they contain a relatively low proportion of constituents which are converted by the oxidizing treatment into substances which do not coagulate or harden either upon standing or exposure to the air or to other oxidizing influences, such as glyceride of oleic acid; and they contain little, if any, of constituents which are unavoidably converted by the oxidizing treatment into substances which exist only in coagulated form, such as glyceryl elaeostearate which is present in large proportion in tung oil and of which the oxidation product is coagulated. As above indicated, other oils possess these characteristics and are well-suited for treatment in accordance with this invention, a further example of oil obtainable in commercial quantities being rubber-seed oil. Coagulation of drying oil results when it is subjected to extensive uncontrolled oxidation at somewhat elevated temperature, as in the production of linoxyn in linoleum manufacture; gelation of drying oil occurs, in the absence of oxidation, as a result of mere heat reaction when the oil is subjected, with or without a catalyst, to very high temperature and combustion is prevented by avoiding oxidizing conditions, as in the heating of oil to 500° to 600° F. in an inert atmosphere in ordinary varnish manufacture; and there is little or no tendency for oxidized oil particles to agglomerate at room temperatures. Accordingly, the oxidizing operation is carried out at temperatures low enough to avoid combustion due to the presence of substantial quantities of oxygen and at temperatures above ordinary room temperatures, temperatures heretofore employed in the oxidation of drying or semi-drying oils being suitable, e. g., 60° C. to 110° C. for the aeration of linseed oil.

It is recognized that oxidized oils have been used heretofore as plasticizing agents in cellulose ester compositions; also that blown oils have been admixed with nitro-cellulose for certain purposes. The development, however, of a protective coating having as the minor component cellulose nitrate, and as the major component that component of an oxidized drying or semi-drying oil or oil-resin mix which is in fluid phase and which is substantially free from uncoagulated oxidation products, such as linoxyn, and has been separated from a substantial proportion of the unoxidized and unoxidizable and oxidized but undesirable constituents of the oil, is basically novel. In the development, therefore, of such a protective coating composition, and of coatings formed thereof or containing the same and of the ultimate composition in hardened state and in film or other form, the present inventors assert their pioneership.

References herein to oxidized drying or semi-drying oil are intended as references to drying or semi-drying oil that was originally in substantially its natural state but which has been subjected while in that state to oxidizing treatment whereby the more or less readily oxidizable constituents of the oil are oxidized but the constituents of the oil are not otherwise substantially changed, such oxidizing treatment producing oxidized glycerides; and reference herein to constituents (or components) of oxidized drying oil are intended as references to ingredients or parts of such an oxidized oil and are not references to compounds such as acids or oxidized acids which may be derived from such oil only by treatment other than or additional to oxidizing treatment. Thus, the fluid component of oxidized drying oil will, as above pointed out, include oxidized glycerides of fatty acids and also unoxidized constituents; and in accordance with this invention various constituents may be removed from such fluid component such as unoxidized oil constituents, or unoxidizable oil constituents, or oxidized but non-hardening oil constituents, or any two or more of such classes of oil constituents. The fluid component containing a major portion of oxidized glycerides and so separated from various of said undesirable constituents is a new and valuable vehicle for coatings, regardless of whether other vehicles commonly employed in protective coatings are employed in conjunction therewith, and it is so described and claimed in our co-pending application, Serial No. 576,206, filed November 19, 1931; but that fluid component so separated from undesirable constituents is peculiarly compatible with nitro-cellulose, as above set forth, and it is so claimed herein.

We claim:

1. The process of preparing a protective coating composition which comprises the steps of admixing a drying or semi-drying oil and a resin, oxidizing said mixture, discontinuing the oxidation prior to the coagulation of the oxidized oil-resin to form linoxyn, treating the oxidized mixture to remove unoxidized and non-hardening oil constituents, and admixing the treated oil-resin mixture with cellulose nitrate in the presence of a common solvent.

2. The process of preparing a protective coating composition which comprises the steps of oxidizing a drying or semi-drying oil, discontinuing the oxidation prior to the coagulation of the oxidized oil to form linoxyn, extracting the oxidized oil with a selective solvent to remove unoxidized and non-hardening oil constituents, and admixing the extracted oil with cellulose nitrate in the presence of a common solvent.

3. The process of preparing a protective coating composition which comprises the steps of subjecting a substance comprising a drying or semi-drying oil to oxidizing treatment limited substantially to the formation of uncoagulated products of oxidation, separating the resulting product into fractions of which one is richer than is said product in unoxidized and non-hardening constituents and another is richer than is said product in fluid oxidized constituents capable of hardening without substantial further oxidation, and dissolving said last named fraction and nitro-cellulose in a common solvent.

4. The process of preparing a protective coating composition which comprises the steps of subjecting a substance comprising a drying or semi-drying oil to oxidizing treatment limited substantially to the formation of uncoagulated products of oxidation, fractionally extracting the resulting product to produce fractions of which one is richer than is said product in unoxidized and non-hardening constituents, and another is richer than is said product in fluid oxidized constituents capable of hardening without substantial further oxidation, and dissolving said last-named fraction and nitro-cellulose in a common solvent.

5. A protective coating composition comprising cellulose nitrate, and that component of an oxidized drying of semi-drying oil which is in fluid phase and separated from a substantial proportion of unoxidized oil constituents and oxidized glyceride of oleic acid of the oxidized oil.

6. The process of preparing a protective coating composition which comprises the steps of oxidizing a drying or semi-drying oil, discontinuing the oxidation prior to the coagulation of the oxidized oil to form linoxyn, treating the oxidized oil to remove unoxidized oil constituents and oxidized glyceride of oleic acid of the oxidized oil, and admixing the treated oil with cellulose nitrate in the presence of a common solvent.

7. A protective coating composition comprising a homogeneous mixture of nitrocellulose, and that component of oxidized drying or semi-drying oil which, after the oxidation of the oil, is in fluid phase, is separated from a substantial proportion of the unoxidized and non-hardening oil constituents of the oxidized oil, and is capable of hardening without further substantial oxidation.

8. A protective coating composition comprising a homogeneous mixture of nitrocellulose, a resin, and that component of oxidized drying or semi-drying oil which, after the oxidation of the oil, is in fluid phase, is separated from a substantial proportion of the unoxidized and non-hardening oil constituents of the oxidized oil, and is capable of hardening without further substantial oxidation.

9. A protective coating composition comprising nitrocellulose; that component of oxidized linseed oil which, after the oxidation of the oil, is in fluid phase, is separated from a substantial proportion of the unoxidized and non-hardening oil constituents of the oxidized oil, and is capable of hardening without further substantial oxidation; and sufficient of a solvent for said component and nitrocellulose to maintain fluidity of the composition.

10. A protective coating composition comprising nitrocellulose; that component of oxidized drying or semi-drying oil which is in fluid phase after the oxidation of the oil, is capable of hardening without further substantial oxidation, and is separated from a substantial proportion of the non-hardening oil constituents of the oxidized oil; and sufficient of a solvent for said component and nitrocellulose to maintain the fluidity of the composition.

11. The process which comprises the steps of subjecting a substance comprising a drying or semi-drying oil to oxidizing treatment, discontinuing the oxidizing treatment prior to coagulation of the oxidized oil, treating the oxidized oil to remove unoxidized oil constituents and non-hardening oil constituents of the oxidized oil, and dissolving nitrocellulose and the treated oil in a common solvent.

12. A composition comprising a solution of nitrocellulose, and that component of oxidized drying or semi-drying oil which is in fluid phase after the oxidation of the oil, is capable of hardening without further substantial oxidation, and is separated from a substantial proportion of the unoxidized and non-hardening oil constituents of the oxidized oil, said solution being substantially identical with the product of the process of claim 11.

13. A composition comprising a homogeneous mixture of a resin, nitrocellulose, and that component of oxidized drying or semi-drying oil which, after the oxidation of the oil, is in fluid phase, is separated from a substantial proportion of the unoxidized and non-hardening oil constituents of the oxidized oil, and is capable of hardening without further substantial oxidation.

14. A protective coating composition comprising nitrocellulose, and the fluid oxidized glycerides of linolenic and linolic acids of oxidized drying or semi-drying oil, separated from a substantial proportion of unoxidized and non-hardening oil constituents of the oxidized oil.

15. A protective coating composition comprising nitrocellulose; a component comprising the fluid oxidized glycerides of linolenic and linolic acids of oxidized drying or semi-drying oil, said component containing less than 10% by weight on said oxidized glycerides of oil constituents soluble in petroleum ether; and a common solvent for said component and nitrocellulose.

16. A protective coating composition comprising as a minor component nitrocellulose, and as a major component that component of oxidized drying or semi-drying oil which, after the oxidation of the oil, is in fluid phase, is separated from a substantial proportion of the unoxidized and non-hardening oil constituents of the oxidized oil, and is capable of hardening without further substantial oxidation.

17. A protective coating composition comprising nitrocellulose; that component of oxidized mixture of a resin and drying or semi-drying oil which, after the oxidation of the mixture, is in fluid phase, is separated from a substantial proportion of the unoxidized and non-hardening oil constituents of the oxidized mixture, and is capable of hardening without further substantial oxidation; and a solvent for said nitrocellulose and said component.

18. A protective coating composition comprising nitrocellulose; a resin; that component of oxidized linseed oil which is in fluid phase after the oxidation of the oil, is capable of hardening without further substantial oxidation, and is separated from a substantial proportion of the non-hardening oil constituents of the oxidized oil; and sufficient of a solvent for said component and nitrocellulose to maintain the fluidity of the composition.

19. A protective coating composition comprising nitrocellulose, and that component of oxidized drying or semi-drying oil which, after the oxidation of the oil, is in fluid phase, is separated from a substantial proportion of the unoxidized oil constituents and oxidized glyceride of oleic acid of the oxidized oil, and is capable of hardening without further substantial oxidation.

20. The process which comprises subjecting to oxidation a substance containing a drying or semi-drying oil, discontinuing the oxidation prior to coagulation of the oil, treating the oxidized oil to reduce its content of unoxidized and non-hardening constituents of the oxidized oil and produce an oxidized oil component capable of hardening without further substantial oxidation, and dissolving nitrocellulose and said component in a common solvent.

ROBERT D. BONNEY.
WALTER S. EGGE.